United States Patent
Bell et al.

(10) Patent No.: US 8,938,356 B1
(45) Date of Patent: Jan. 20, 2015

(54) TACTICAL FLIGHT DATA VALIDATING SYSTEMS AND METHODS FOR A MULTI-CHANNEL TOPOLOGICAL ARCHITECTURE

(71) Applicants: Douglas A. Bell, Marion, IA (US); Bradley R. Mickelson, Cedar Rapids, IA (US); Thomas M. Scanlon, Cedar Rapids, IA (US); Stephen M. Kleckner, Cedar Rapids, IA (US); Jason M. Vanderhorn, Cedar Rapids, IA (US); Stephen W. Howard, Cedar Rapids, IA (US)

(72) Inventors: Douglas A. Bell, Marion, IA (US); Bradley R. Mickelson, Cedar Rapids, IA (US); Thomas M. Scanlon, Cedar Rapids, IA (US); Stephen M. Kleckner, Cedar Rapids, IA (US); Jason M. Vanderhorn, Cedar Rapids, IA (US); Stephen W. Howard, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 111 days.

(21) Appl. No.: 13/624,531

(22) Filed: Sep. 21, 2012

(51) Int. Cl.
*G01S 1/00* (2006.01)
*G08G 5/00* (2006.01)

(52) U.S. Cl.
CPC ...................................... *G08G 5/003* (2013.01)
USPC .............................................. 701/466; 701/4

(58) Field of Classification Search
CPC .............................. G01C 21/26; G05D 1/0278
USPC ............................ 701/466, 3, 4, 9, 120, 477
See application file for complete search history.

(56) References Cited

U.S. PATENT DOCUMENTS

2007/0106433 A1 * 5/2007 He ................................... 701/16

* cited by examiner

*Primary Examiner* — Thomas G Black
*Assistant Examiner* — Luke Huynh
(74) *Attorney, Agent, or Firm* — Donna P. Suchy; Daniel M. Barbieri

(57) ABSTRACT

Present novel and non-trivial systems and methods for validating single-channel tactical flight data in a multi-channel architecture are disclosed. Three single-channel monitors are disclosed along with a fourth, external monitor that is accessible to the multiple channels. A system could be comprised of a navigation data source, two or more communications channels, and an external display unit ("DU"), where each channel may be comprised of a flight management system ("FMS"), a DU, and a flight director ("FD") system. In addition to the FMS performing two standard functions of calculating a lateral deviation ("LDEV") and a roll command ("Roll Cmd"), a second LDEV/Roll Command calculator and a Roll Command Calculator are employed in DU and FD of same channel, respectively, to determine data validity. In addition, the FD and the symbologies of LDEV and Roll Cmd generated by the DU are also employed in the determination of data validity.

26 Claims, 12 Drawing Sheets

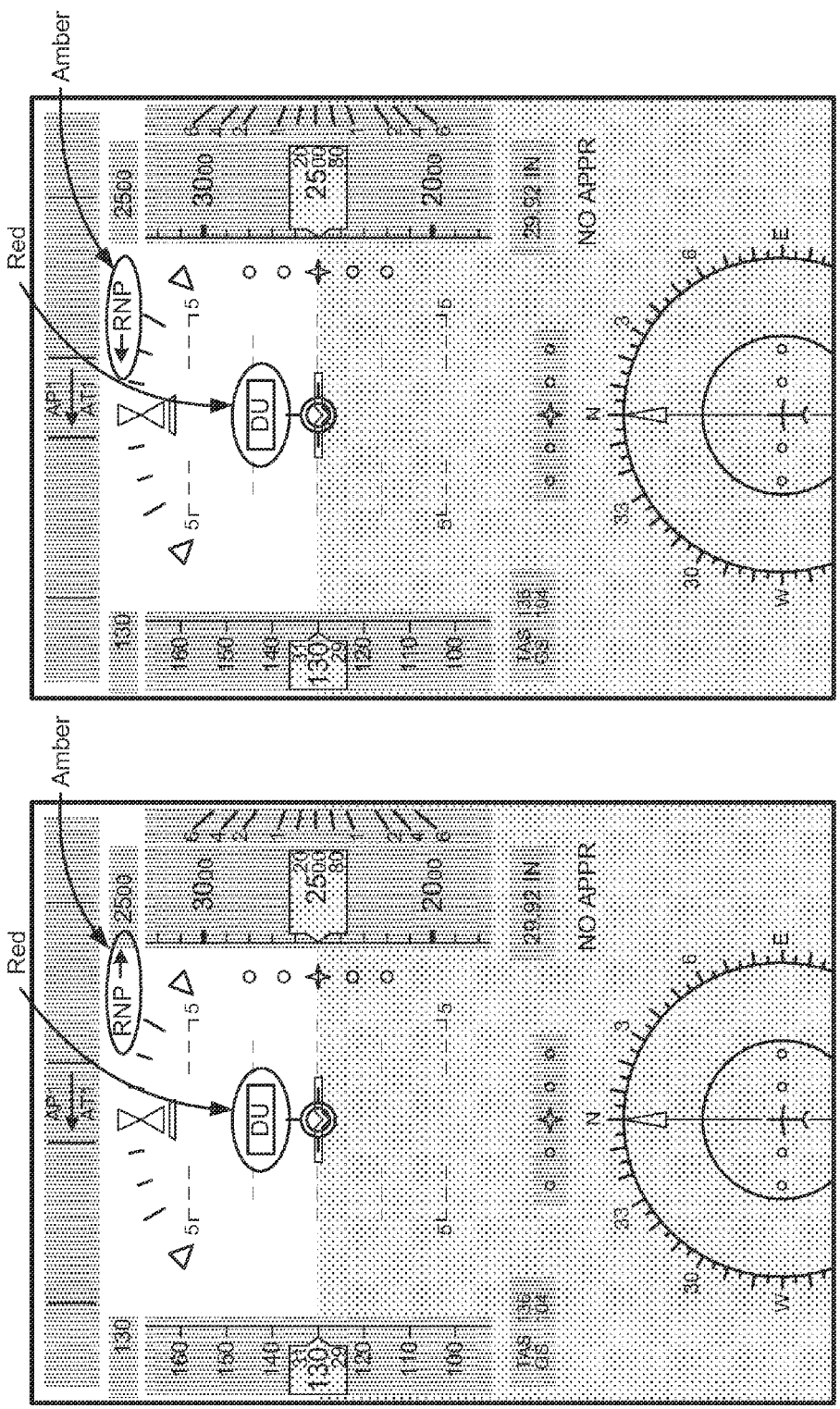

TACTICAL FLIGHT DATA VALIDATING SYSTEMS AND METHODS FOR A MULTI-CHANNEL TOPOLOGICAL ARCHITECTURE

BACKGROUND OF THE INVENTION

1. Field of the Invention

This invention pertains generally to the field of navigation systems such as, but not limited to, aircraft navigation systems.

2. Description of the Related Art

The continuing growth of aviation has placed increasing demands on airspace capacity and emphasizes the need for the best use of the available airspace. These factors, along with the accuracy of modern aviation navigation systems and the requirement for increased operational efficiency in terms of direct routings and track-keeping accuracy, have resulted in the concept of "Required Navigation Performance" ("RNP") standards—statements of the navigation performance accuracy necessary for operation within a defined airspace. Some of these standards appear in an Advisory Circular ("AC") 90-101A published by the Federal Aviation Administration ("FAA") and in a Document ("DO") published by the Radio Technical Commission for Aeronautics ("RTCA"). For example, the FAA has published AC 120-29A entitled "Criteria for Approval of Category I and Category II Weather Minima for Approach," and the RCTA has published DO-236B entitled "Minimum Aviation System Performance Standards: Required Navigation Performance for Area Navigation."

RNP may include performance and functional requirements indicated by the RNP type. The RNP type defines the total system error ("TSE") that may be allowed in lateral and longitudinal dimensions within a particular airspace, where the TSE takes into account path definition errors ("PDE"), navigation system errors ("NSE"), and flight technical errors ("FTE"). The RNP type is used to specify navigation requirements for the airspace or a navigation system that provides a specified level of accuracy defined by a lateral area of confined airspace in which an RNP-certified aircraft operates. For example, an RNP 0.3 level requires a normal navigational accuracy of 0.3 nautical miles ("NM") at least 95 percent of the total flight time; similarly, an RNP 0.1 level requires a normal navigational accuracy of 0.1 NM at least 95 percent of the total flight time. Hence, a lower level of RNP means a greater level of navigational accuracy. With the availability of satellite navigation systems such as the Global Positioning System ("external source"), future airspace systems may rely heavily on external source-based navigation to which stringent standards for NSE may be applied. An instrument approach procedure ("IAP") specifying an RNP level of less than RNP 0.3 or lower than the standard minima at airports not equipped with Instrument Landing Systems ("ILS") airports may require a method to detect external source position errors before the 6.2 second time-to-alert standard that currently exists. A similar requirement may be made for manufacturers and/or end-users wishing to take advantage of the standards published in RTCA DO-315B entitled "Minimum Aviation System Performance Standards (MASPS) for Enhanced Vision Systems, Synthetic Vision Systems, Combined Vision Systems and Enhanced Flight Vision Systems."

AC 90-101A prescribes one method to comply with RNP<0.3 requirements. This method's system architecture requires dual FMS, dual GPS, dual FD or autopilot and a single IRS as the minimum architecture for a RNP<0.3 system. This minimum architecture provides the redundancy required to meet the probability of presenting misleading information to the pilot or flight crew of $1*10^{\wedge}(-7)$. To meet the desired probability of misleading information requires both sides of a dual system be compared by the system itself or by the pilot to detect when a failure occurs. AC90-101A, also, requires the loss of all lateral deviation be equal to or less than $1*10^{\wedge}(-7)$. The achievement of this requirement is not readily available in a dual-channel system because the channel-to-channel comparison required to meet the architectural requirement may also result in a failing of both channels because it may not readily apparent to the system, pilot, or flight crew which data source has failed and which one is acceptable. To meet the requirement, the integrity of each channel in the dual-channel system may be determined independently of the other. Furthermore, the detection of the favorable channel could be considered important to the pilot who is executing one or more Radius-to-Fix (RF) legs because an aircraft flying at 180 knots will fail to meet the requirements of RNP 0.1 in 4 to 6 seconds after a failure. This may be an unacceptable amount of time in which to determine an unfavorable channel.

BRIEF SUMMARY OF THE INVENTION

The embodiments disclosed herein present novel and non-trivial systems and methods for validating tactical flight data of a single-channel in a multi-channel topological architecture. With the embodiments disclosed herein, the pilot and/or any user system may be informed not only of an inoperative or unfavorable data channel but also of the identity of the channel, allowing the pilot to manually switch to the operative or favorable channel or an aircraft user system to automatically make the switch.

In one embodiment, a first system for validating tactical flight data employed in a multi-channel topological architecture is disclosed. The system may be comprised of one or more sources of navigation data, a first communications channel comprised of a first source of flight management data and a first monitor configured to perform the method of the following paragraph, and a second communications channel comprised of a second source of flight management data and a second monitor. In an additional embodiment, the first and second communications channels could each include a display unit ("DU") comprised of the first and second monitors, respectively.

In another embodiment, a first method for validating tactical flight data employed in a multi-channel topological architecture is disclosed, where the method could be performed by the first monitor (and it counterpart second monitor). When properly configured, each monitor could receive data representative of a first measurement of lateral deviation ("LDEV") and a second measurement of LDEV, perform a validity determination as a function of the first and second measurements, and generate validity advisory data responsive to the determination.

In another embodiment, a second system for validating tactical flight data employed in a multi-channel topological architecture is disclosed. The system may be comprised of one or more sources of navigation data; a first communications channel comprised of a first source of flight management data, a second source of flight management data, and a first monitor configured to perform the method of the following paragraph; and a second communications channel comprised of a third source of flight management data, a fourth source of flight management data, and a second monitor. In an additional embodiment, a DU could be comprised of the second source of flight management data and the first monitor.

In another embodiment, a second method for validating tactical flight data employed in a multi-channel topological architecture is disclosed, where the method could be performed by the first monitor (and it counterpart second monitor). When properly configured, each monitor could receive data representative of a first measurement of LDEV and a second measurement of LDEV, where both measurements may be based upon, in part, a pseudo flight plan; perform a validity determination as a function of the first and second measurements; and generate validity advisory data responsive to the determination.

In another embodiment, a third system for validating tactical flight data employed in a multi-channel topological architecture is disclosed. The system may be comprised of one or more communications channels, each comprised of at least two of the following: a first source of flight management data, a source of flight director data, and a source of symbology data. A monitor may receive one or more sets of input data from the first channel: a first roll command ("Roll Cmd") and a second Roll Cmd; a Roll Cmd and the symbology of the Roll Cmd; and LDEV measurement and symbology of the LDEV measurement; perform a validity determination as a function of the inputs; and generate validity advisory data responsive to each determination. Additionally, the monitor may receive one or more sets of input data from the second channel: a first Roll Cmd and a second Roll Cmd; a Roll Cmd and the symbology of the Roll Cmd; and LDEV measurement and symbology of the LDEV measurement; perform a validity determination as a function of the inputs; and generate validity advisory data responsive to each determination.

BRIEF DESCRIPTION OF THE DRAWINGS

FIG. 13A depicts a tactical flight image presenting third advisory information of invalid data.

FIG. 13B depicts a tactical flight image presenting fourth advisory information of invalid data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
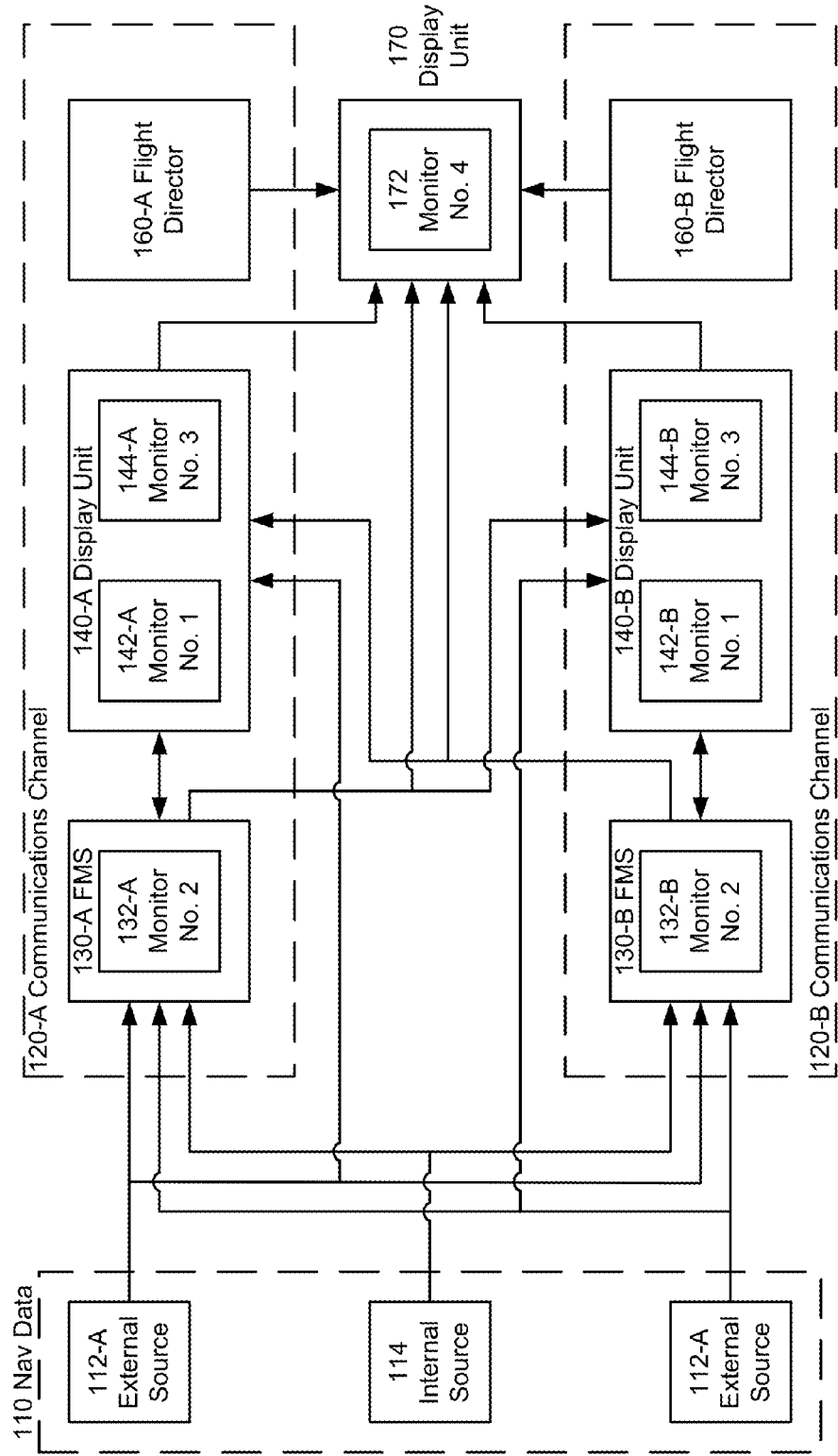
FIG. 1 depicts a functional block diagram of a system for validating tactical flight data.

FIG. 1 depicts a functional block diagram of a navigation data validation system 100 suitable for implementation of the techniques described herein. The functional blocks of the system may include sources of navigation data 110, a plurality of communications channels 120, and a DU 170 external to the plurality of communication channels.

In an embodiment of FIG. 1, the navigation data sources 110 may be comprised of one or more systems for acquiring and providing navigation data to any aircraft system requiring an input of navigation data. As embodied herein, data could be comprised of any analog or digital signal, either discrete or continuous, which could contain information. As embodied herein, signals are synonymous with data. In addition, aircraft could mean any manned or unmanned vehicle which is able to fly through the air, atmosphere, and/or space including, but not limited to, lighter than air vehicles and heavier than air vehicles, wherein the latter may include fixed-wing and rotary-wing vehicles. Additionally, aircraft could be watercraft capable of operating on or beneath water.

The navigation data source 110 could be comprised of, but not limited to, an external source 112 and/or an internal source 114. The external source 112 may refer to a data source which acquires raw data from a source external to the aircraft, and the internal source 114 may refer to a data source which acquires raw data from a source internal to the aircraft. For both types of sources, the raw data could be data from which navigation data may be determined.

An example of an externally-sourced navigation data source 112 is a satellite navigation system such as the global positioning system ("external source"). From the external source 112, navigation data such as aircraft position data comprised of geographic position (e.g., latitude and longitude coordinates) data and altitude data may be determined and provided as output. In addition, data representative of the quality of the navigation data may be provided by the navigation data source 112, where such data may include parameters associated with, but not limited to, accuracy, resolution, integrity, uncertainty, and/or validity. Those skilled in the art understand that quality of navigation data could depend on the system providing the data, e.g., an air/data system ("ADS"), an attitude heading reference system ("AHRS"), an inertial guidance system (or inertial reference system) (collectively, "IRS"), and an FMS. Furthermore, the quality of navigation data provided by a system could depend on other considerations.

Examples of an internally-sourced navigation data source 114 could include, but not be limited to, an AHRS, an ADS, and a radar altimeter system ("Rad Alt") (the term "radar altimeter" is also known as "radio altimeter" to those skilled in the art). The AHRS could be representative of any system in which navigation data is derived from inertial sensors such as accelerometers for measuring motion on the axes of an aircraft and/or gyroscopes for measuring rotation about the axes. Known to those skilled in the art and depending on the specific configuration, the AHRS is an inertial system that could provide output data representative of heading, pitch, roll, body rate and accelerations, and/or vertical acceleration from which vertical velocity data may be derived, where vertical velocity data may be considered vertical travel data representative of a vertical distance traveled over a period of time. As disclosed herein, data which may be used to measure vertical movements may be considered vertical travel data.

The ADS could be representative of any system in which navigation data is derived from an aircraft's pitot-static system and the sensors thereof. Known to those skilled in the art, the ADS could provide output data representative of barometric altitude, corrected barometric altitude, altitude trend, computed airspeed, true airspeed, mach number, static air temperature, and/or total air temperature.

In an embodiment of FIG. 1, an avionics topology comprised of the plurality of communication channels 120 is shown, wherein each channel is comprised of the same system and/or components. As shown in FIG. 1, each channel is comprised of a flight management system ("FMS") 130, a display unit ("DU") 140, and a flight director ("FD") 160.

In an embodiment of FIG. 1, the FMS 130 could be any source(s) from which flight information may be stored and provided to various user systems and/or components of the aircraft. The FMS may perform a variety of functions performed to help the crew in the management of the flight, and such functions are known to those skilled in the art. In the performance of its many functions, the FMS may receive navigation data from the navigation data source 110.

It should be noted that data could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

Functions performed by the FMS could include the receiving of flight plan information and constructing lateral and vertical flight plan components. A pilot could create the flight plan comprised of a series of waypoints from waypoints stored in a database or select a flight plan stored in a navigation database of the FMS. Also, the flight plan may be modified at any time. The flight plan could be used to guide an aircraft from one position to the next and to compute many flight parameters including, but not limited to, estimated time enroute, estimated time of arrival to a destination airport and/or alternate airport, and estimated fuel consumption between waypoints.

Referring to FIGS. 1, 3, 8, and 11, each FMS 130 may be comprised of a Monitor No. 2 (item 132), a lateral deviation and/or roll command ("LDEV/Roll Command") calculator 134 and an active flight plan 136. As embodied herein, each Monitor No. 2 may perform a data validating method that is disclosed below in detail.

Returning to FIG. 1, each of the seven monitors depicted may be comprised of any electronic data processing unit or combination of units which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. Each monitor may be driven by the execution of software or computer instruction code containing algorithms developed for the specific functions embodied herein. Each monitor may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "monitor" is not limited to such processing units and its meaning is not intended to be construed narrowly. As embodied herein, the monitor could be a processor(s) used by or in conjunction with any other system and/or component of the aircraft including those not discussed herein.

As embodied herein, the terms "programmed" and "configured" are synonymous. Each monitor may be electronically coupled to systems and/or sources to facilitate the receiving and providing input data and output data, respectively. As embodied herein, operatively coupled may be considered as interchangeable with electronically coupled. It is not necessary that a direct connection be made; instead, such receipt of input data and the providing of output data could be provided through a data bus or through a wireless network. One monitor may be programmed or configured to execute one of the methods discussed in detail below.

When an aircraft's geographic position has been provided by the navigation data source 110 to each FMS 130, each LDEV/Roll Command calculator 134 may calculate an aircraft's lateral deviation of its corresponding active flight plan 136 using one or more algorithms known to those skilled in the art. Similarly, each LDEV/Roll Command calculator 134 may calculate a roll command using one or more algorithms known to those skilled in the art, where such roll command may provide steering guidance so that the aircraft may intercept or track the flight path of the actual flight plan without exceeding performance limitations of the aircraft.

Referring to FIGS. 1, 3, 8, and 11, each DU 140 may be comprised of a Monitor No. 1 (item 142), Monitor No. 3 (item 144), a LDEV/Roll Command calculator 146, a pseudo flight plan generator 148, and a symbology generator comprised of a LDEV Symbology Generator 150 and a Roll Command Symbology Generator 152. Each Monitor No. 1 and each Monitor No. 3 may be single-channel monitors configured to perform one of the data validating methods that are discussed in detail below.

As embodied herein, each DU 140 and the DU 170 may be comprised of any visual display unit which may present the pilot with visual information or indications regarding the validity of navigation data. Additionally, the disclosures may apply to a portable device including, but not limited to, tablets which employ a display unit and/or aural alert unit.

Similar to the LDEV/Roll Command calculator 134 of each FMS 130, the LDEV/Roll Command calculator 146 of each DU 140 may calculate a roll command using one or more algorithms known to those skilled in the art. Also, each LDEV Symbology Generator 150 and each Roll Command Symbology Generator 152 may generate symbology (i.e., visual cues) representative of LDEV and Roll Cmd, respectively; the generation of symbology through the use one or more algorithms is known to those skilled in the art.

Each pseudo flight plan generator 148 may be configured to generate a pseudo flight plan. Similar to the composition of an active flight plan, a pseudo flight plan may be comprised of a series of randomly-generated waypoints (either real or pseudo) or predetermined waypoints (either real or pseudo) that could populate a table stored in the DU 140. When presented with the data representative of the pseudo flight plan, each LDEV/Roll Command calculator 134 and LDEV/Roll Command calculator 146 may determine a measurement of LDEV based upon the aircraft's current position in relation to the pseudo flight plan and provide the result to Monitor No. 3 as discussed in detail below.

Figure 11:
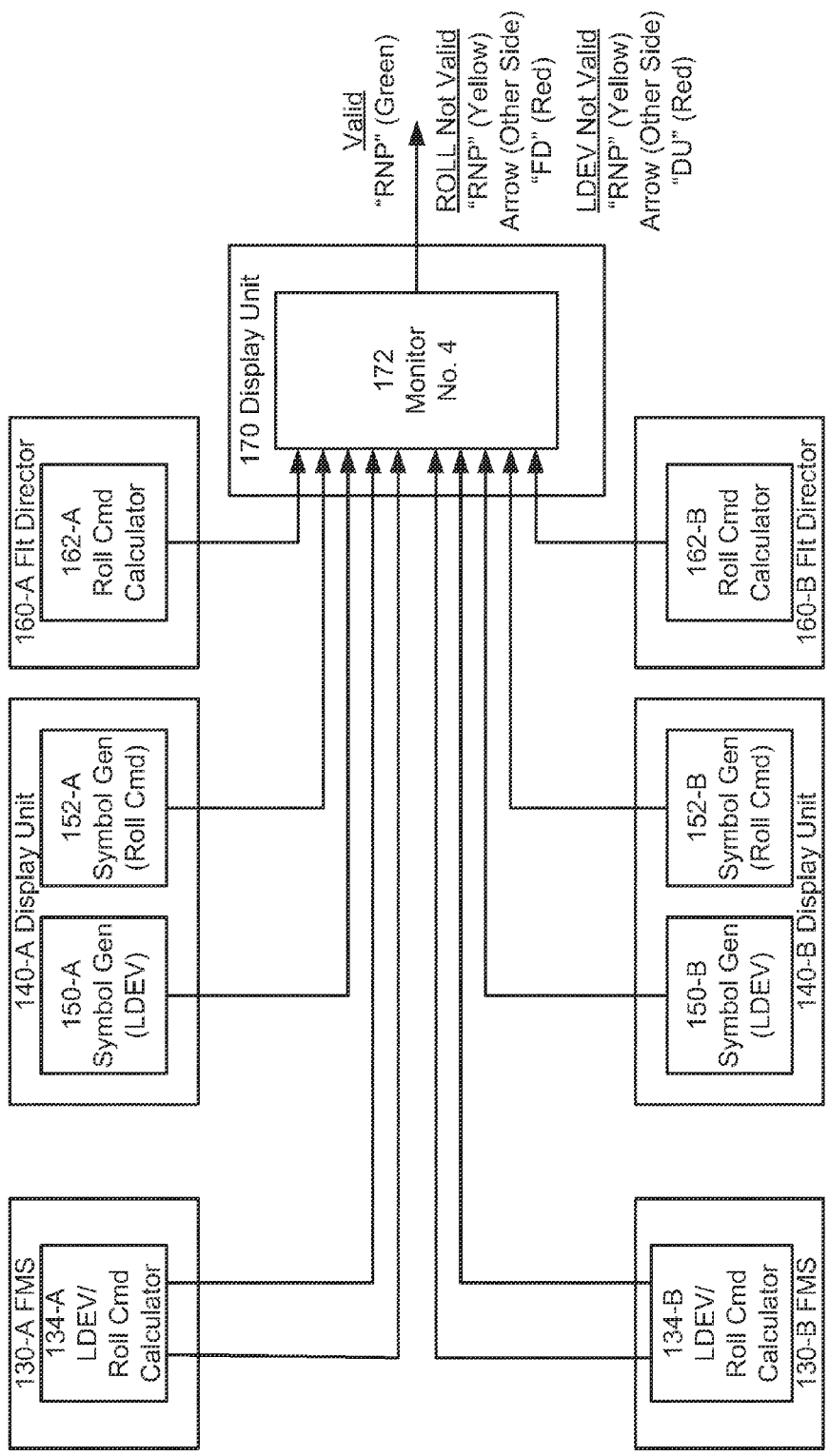
FIG. 11 depicts a data flow diagram corresponding to the method shown in FIG. 10.

Referring to FIGS. 1 and 11, each FD 160 may be comprised of a Roll Command Calculator 162. Similar to the LDEV/Roll Command calculator 134 of each FMS 130, the Roll Command Calculator 162 of each FD 160 may calculate a roll command using one or more algorithms known to those skilled in the art.

Referring to FIGS. 1 and 11, the DU 170 may be any DU that is external to the plurality of communication channels 120, where the DU 170 may be comprised of Monitor No. 4 (item 172). Unlike Monitor Nos. 1, 2, and 3 of the communication channels 120, Monitor No. 4 may not be single-channel monitor; instead, Monitor No. 4 may be configured to receive data from either or both channels and perform the method disclosed below without displaying any of the contents that are being displayed on each DU 140.

The advantages and/or benefits of the embodiments disclosed herein may be illustrated by discussing the methods that may be employed by the monitors. FIGS. 2, 5, 7, and 10 depict flowcharts 200 through 500, respectively, disclosing examples of methods for validating tactical flight data (i.e., flight data relevant to or necessary for the instant or immediate control of the aircraft), where the monitors 132, 142, 144, and 172 may be programmed or configured with instructions corresponding to the following modules embodied in these flowcharts; although discussed separately, the methods disclosed in flowcharts 200 through 500 may be combined into other methods. As embodied herein, the monitors 132, 142, 144, and 172 may be a processor or a combination of processors found in the FMS 130, the DU 140, the FD 160, and/or the DU 170. Also, the monitors 132, 142, 144, and 172 may be processors of modules such as, but not limited to, printed circuit cards having one or more input interfaces to facilitate the two-way data communications of the monitors, i.e., the receiving and providing of data. As necessary for the accomplishment of the following modules embodied in flowcharts 200 through 500, the receiving of data is synonymous and/or interchangeable with the retrieving of data, and the providing of data is synonymous and/or interchangeable with the making available or supplying of data.

Figure 2:
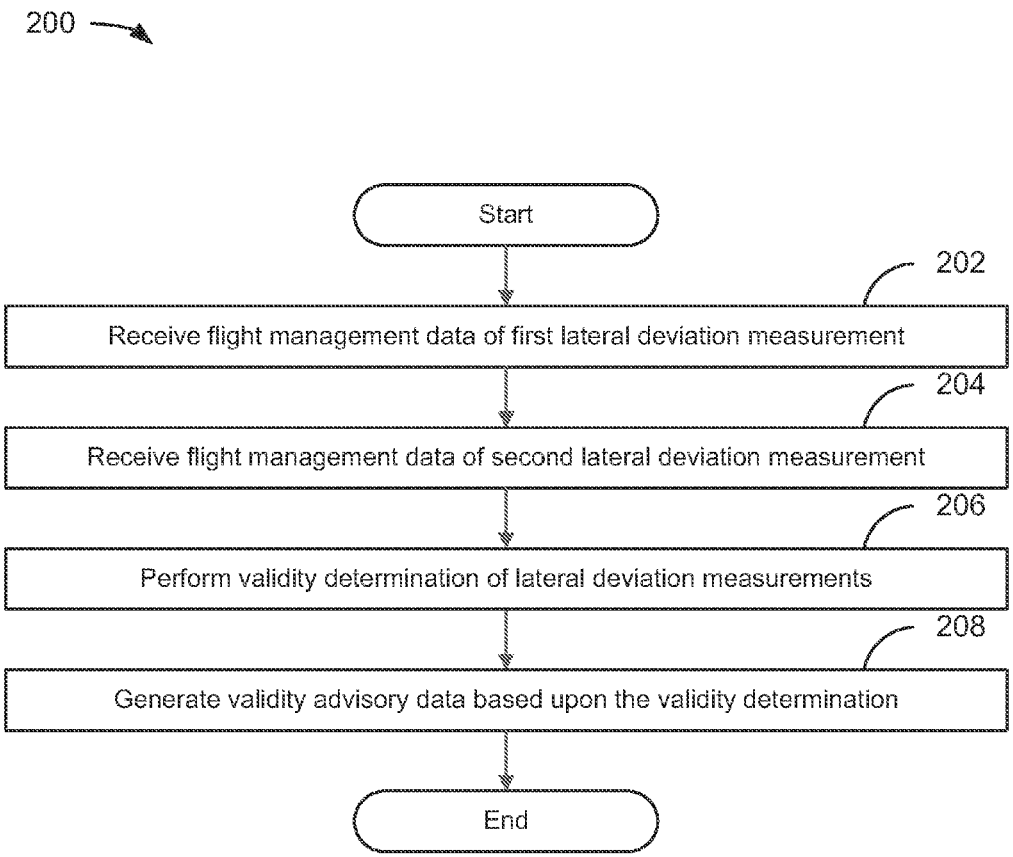
FIG. 2 depicts a flowchart of a first method for validating tactical flight data.
Figure 3:
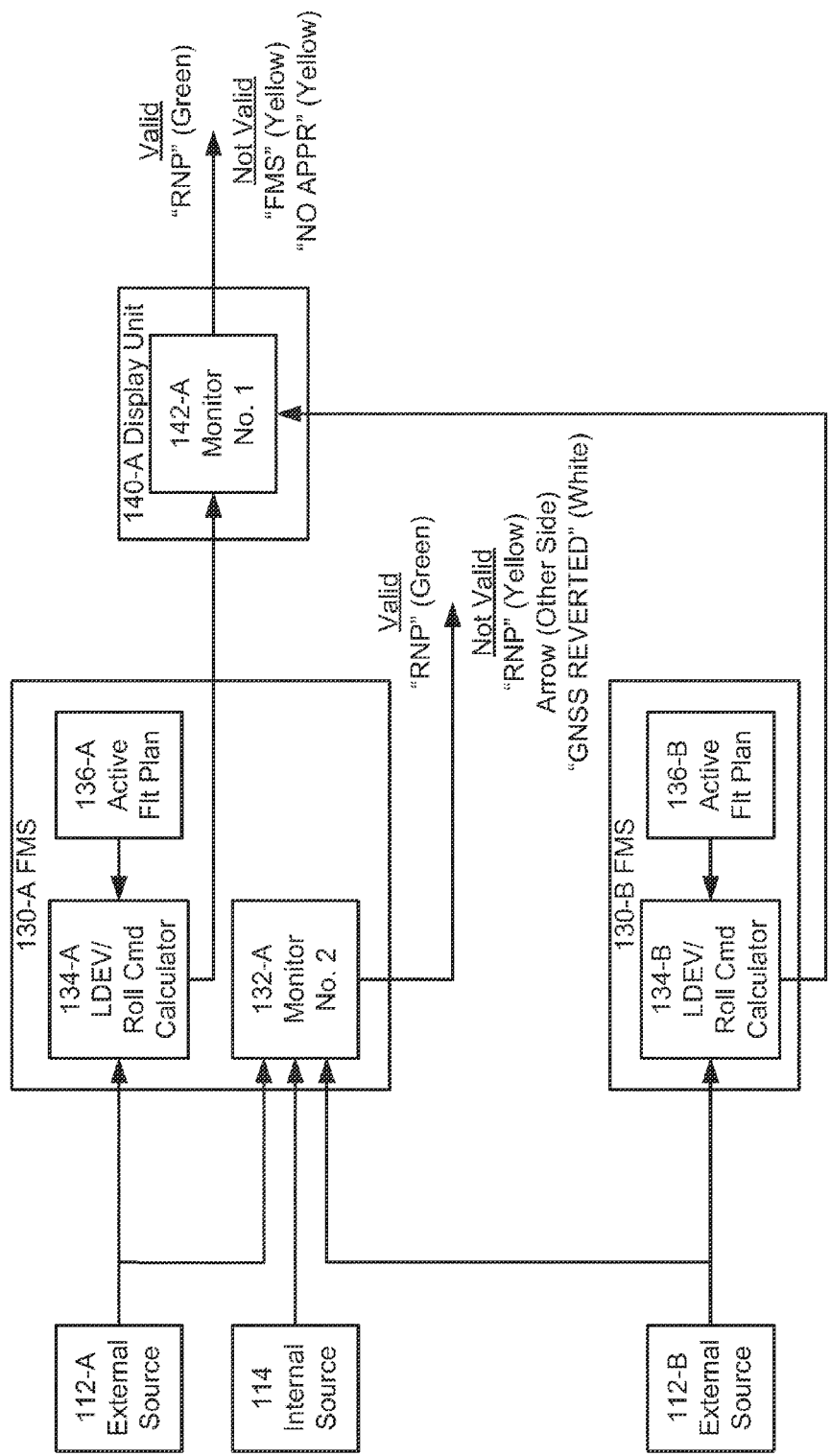
FIG. 3 depicts a data flow diagram corresponding to the methods of FIGS. 2 and 5.

As shown in FIGS. 2 and 3, the flowchart 200 and a data flow diagram are depicted, respectively, illustrating a method performed by Monitor No. 1 (item 142-A) for validating tactical flight data. The flowchart begins with module 202 with the receiving of flight management data representative of a first measurement of LDEV. The LDEV/Roll Command calculator 134-A of the FMS 130-A may have made such determination as a function of the active flight plan 136-A maintained in the FMS 130-A and at least a measurement of aircraft geographic position provided to it by the external source 112-A.

The flowchart continues with module 204 with the receiving of flight management data representative of a second measurement of LDEV determined by the LDEV/Roll Command calculator 134-B of the FMS 130-B, where such determination may be made as a function of the active flight plan 136-B maintained in the FMS 130-B and at least a measurement of aircraft geographic position provided to the LDEV/Roll Command calculator 134-B by the external source 112-B.

The flowchart continues with module 206 with the performing of a validity determination by comparing first measurement of LDEV with the second measurement of LDEV. If both measurements of LDEV fall within a tolerance limit, then Monitor No. 1 (item 142-A) may consider the external sources 112-A and 112-B as being valid. As embodied herein, the tolerance limit(s) discussed herein could be configurable by a manufacturer and/or end-user and dependent upon a desired "Required Navigation Performance" ("RNP") standard corresponding to geographic position of the aircraft. For example, a manufacturer and/or end-user could set the tolerance to a value of 0.125*RNP.

The flowchart continues with module 208 with the generating of validity advisory data in response to the validity determination. As disclosed herein, the validity advisory data may be representative of validity information corresponding to the validity determination, and validity information may be comprised of visual information, aural information, tactile information, or any combination thereof as configured by a manufacturer and/or end-user. Besides being presented to the pilot visually, aurally, and/or tactilely, the validity information could also be provided to other user systems such as, but not limited to, the FMS 130 and/or an auto flight system.

Figure 4B:
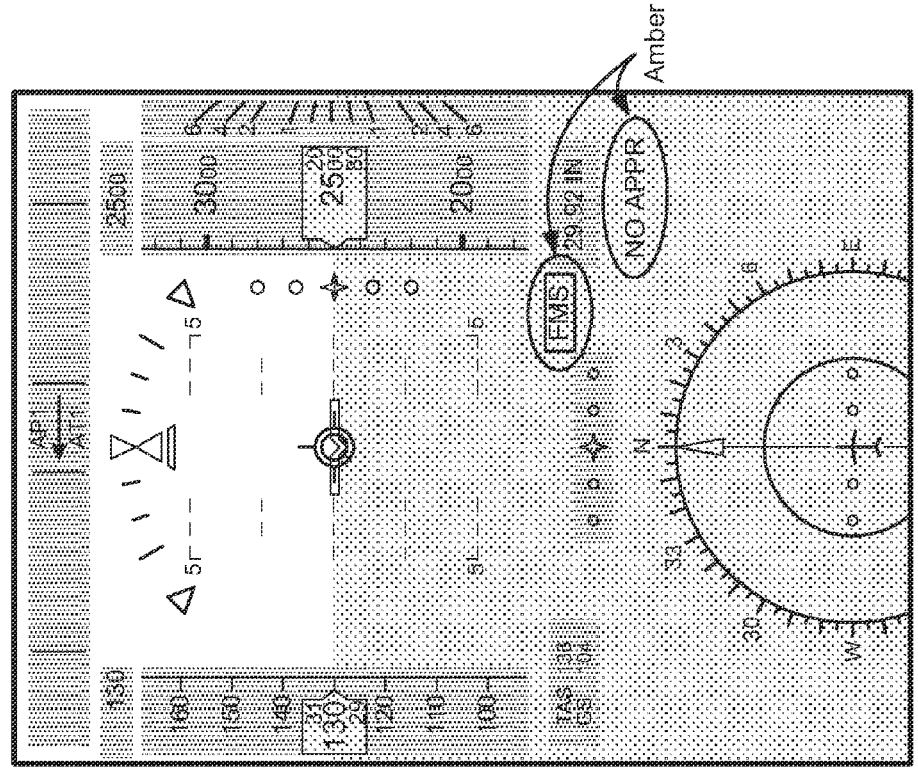
FIG. 4B depicts a tactical flight image presenting advisory information of invalid data.
Figure 4A:
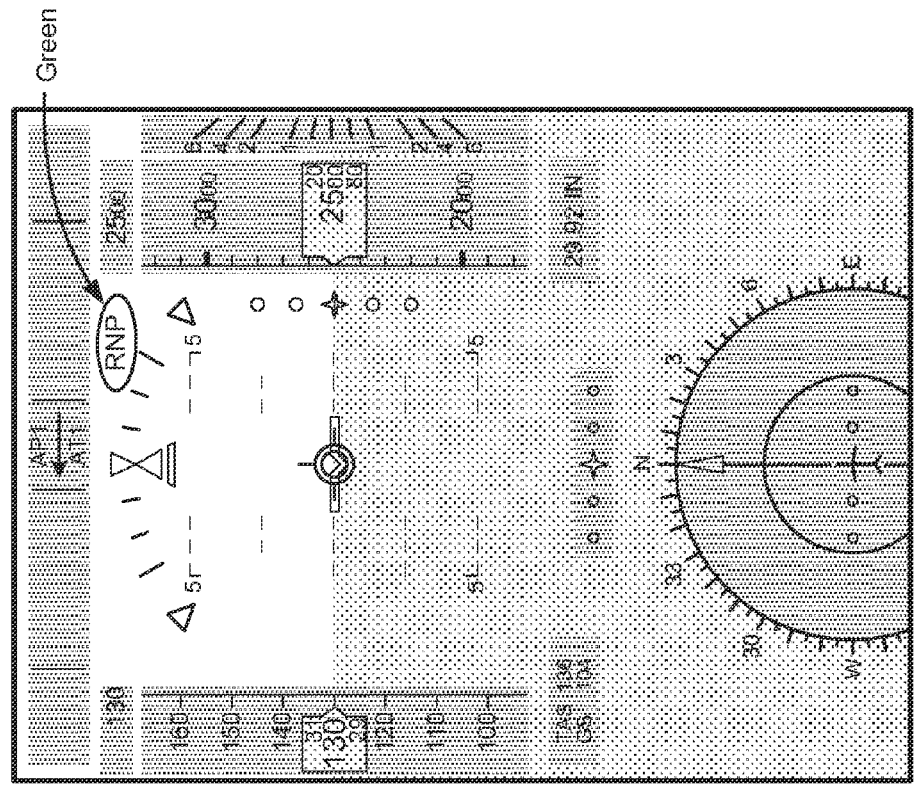
FIG. 4A depicts a tactical flight image presenting advisory information of valid data.

For the purpose of illustration and not of limitation, a favorable validity determination may be presented visually as a text message such as, for example, a green "RNP" that is shown in FIG. 4A, thereby advising the pilot that the navigation data is not invalid for an active instrument approach procedure maintained in the FMS 130-A; similarly, an unfavorable validity determination may be presented visually as text message such as, for example, the absence of the green "RNP" plus a yellow or amber "FMS" and/or "NO APPR" as shown in FIG. 4B, thereby cautioning the pilot that data being provided by the navigation data is not valid for an active instrument approach procedure maintained in the FMS 130-A. Additionally and/or alternatively, the validity determination may be presented with appropriate aural and/or tactile indications via an aural advisory unit and/or a tactile advisory unit. Then, flowchart 200 proceeds to the end.

Figure 5:
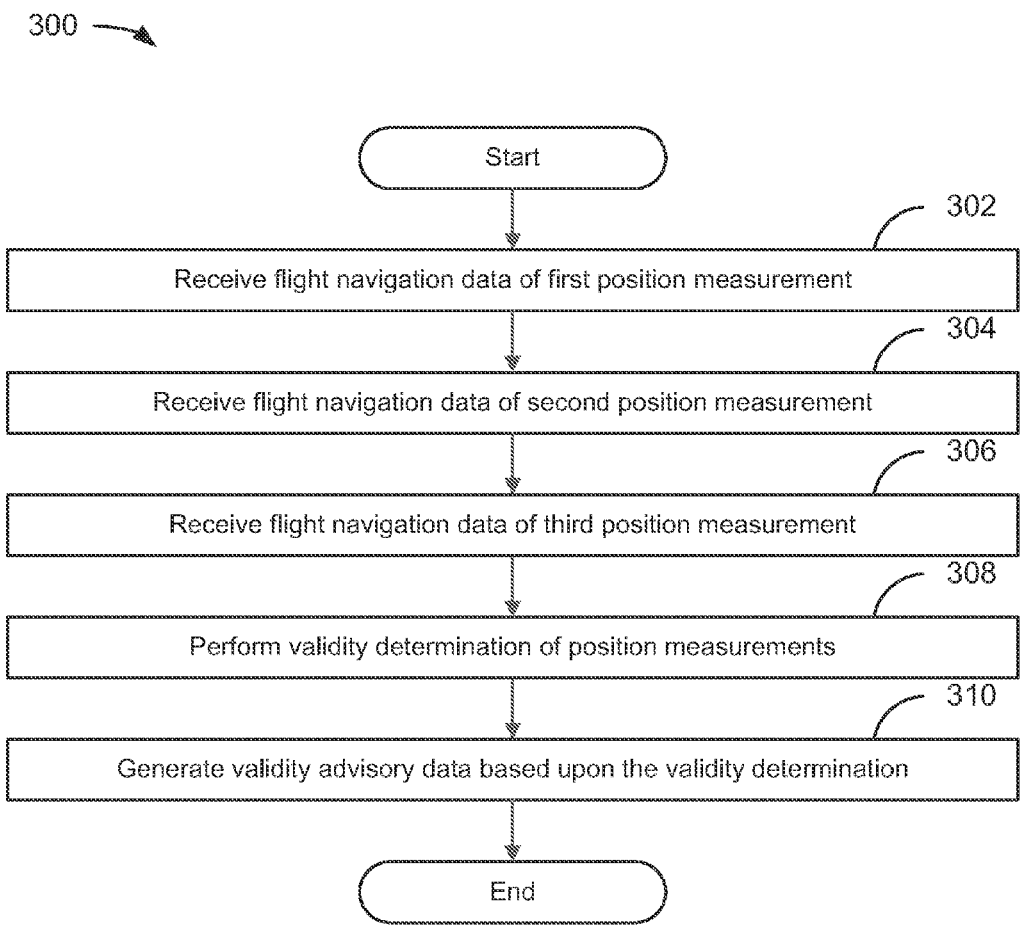
FIG. 5 depicts a flowchart of a second method for validating tactical flight data.

As shown in FIGS. 3 and 5, a data flow diagram and the flowchart 300 are depicted, respectively, illustrating a method performed by Monitor No. 2 (item 132-A) for validating tactical flight data. The flowchart begins with module 302 with the receiving of first navigation data representative of a representative of a first measurement of aircraft geographic position. This first navigation data could be provided by external source 112-A.

The flowchart continues with module 304 with the receiving of second navigation data representative of a representative of a second measurement of aircraft geographic position. This second navigation data could be provided by external source 112-B.

The flowchart continues with module 306 with the receiving of third navigation data representative of a representative of a third measurement of aircraft geographic position. This third navigation data could be provided by internal source 114.

The flowchart continues with module 308 with the performing of a validity determination as a function of the three measurements of aircraft geographic position, where such function is known to those skilled in the art. If the measurements of aircraft geographic position fall within a tolerance limit, then Monitor No. 2 (item 132-A) may consider the external sources 112-A and 112-B and internal source 114 as being valid.

Figure 6:
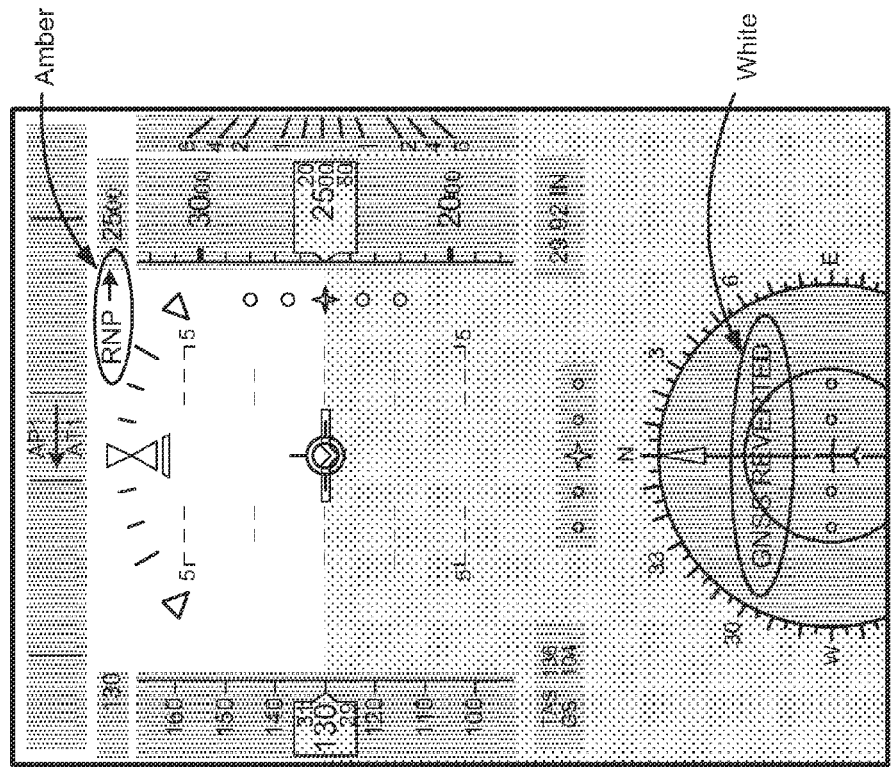
FIG. 6 depicts a tactical flight image presenting advisory information of invalid data.

The flowchart continues with module 310 with the generating of validity advisory data in response to the validity determination. For the purpose of illustration and not of limitation, a favorable validity determination may be presented visually as a text message such as, for example, a green "RNP" that is shown in FIG. 4A; similarly, an unfavorable validity determination may be presented visually as text message such as, for example, a yellow or amber "RNP" and/or a white "GNSS REVERTED" as shown in FIG. 6, thereby cautioning the pilot that data being provided by the navigation data is not valid for an active instrument approach procedure maintained in the FMS 130-A. Also, a graphical message such as an arrow could be used to point to the channel without failures, thereby informing the pilot to select another channel. Then, flowchart 300 proceeds to the end.

Figure 7:
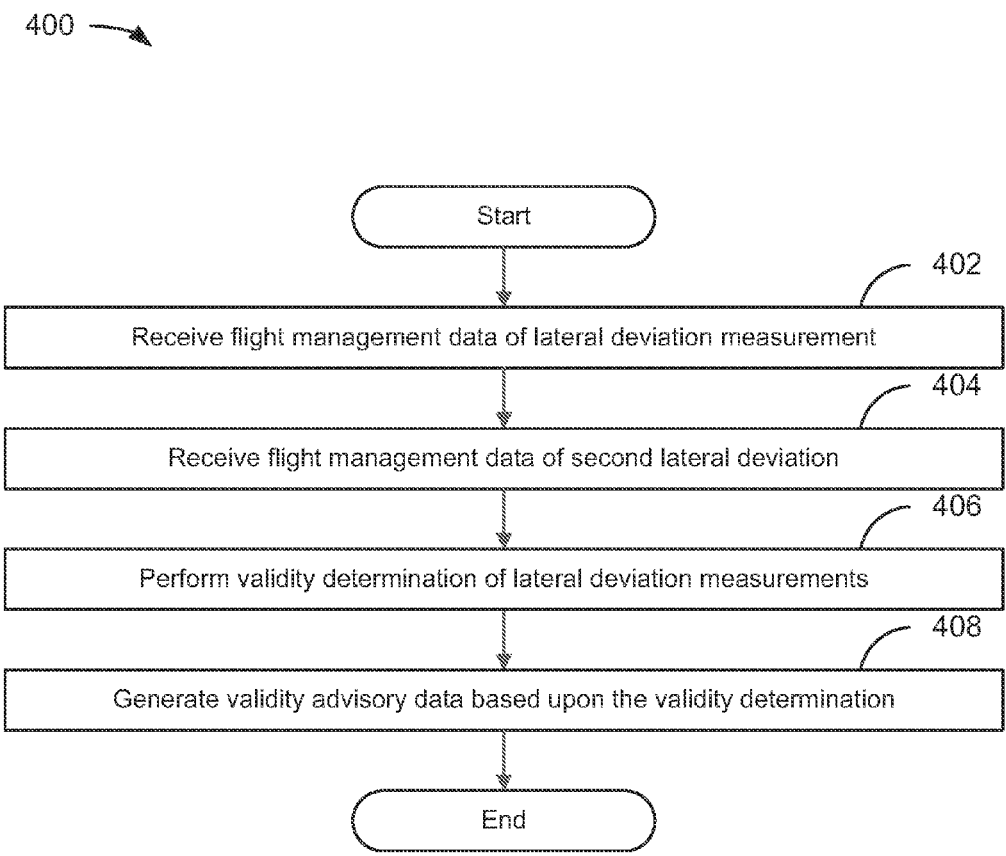
FIG. 7 depicts a flowchart of a third method for validating tactical flight data.
Figure 8:
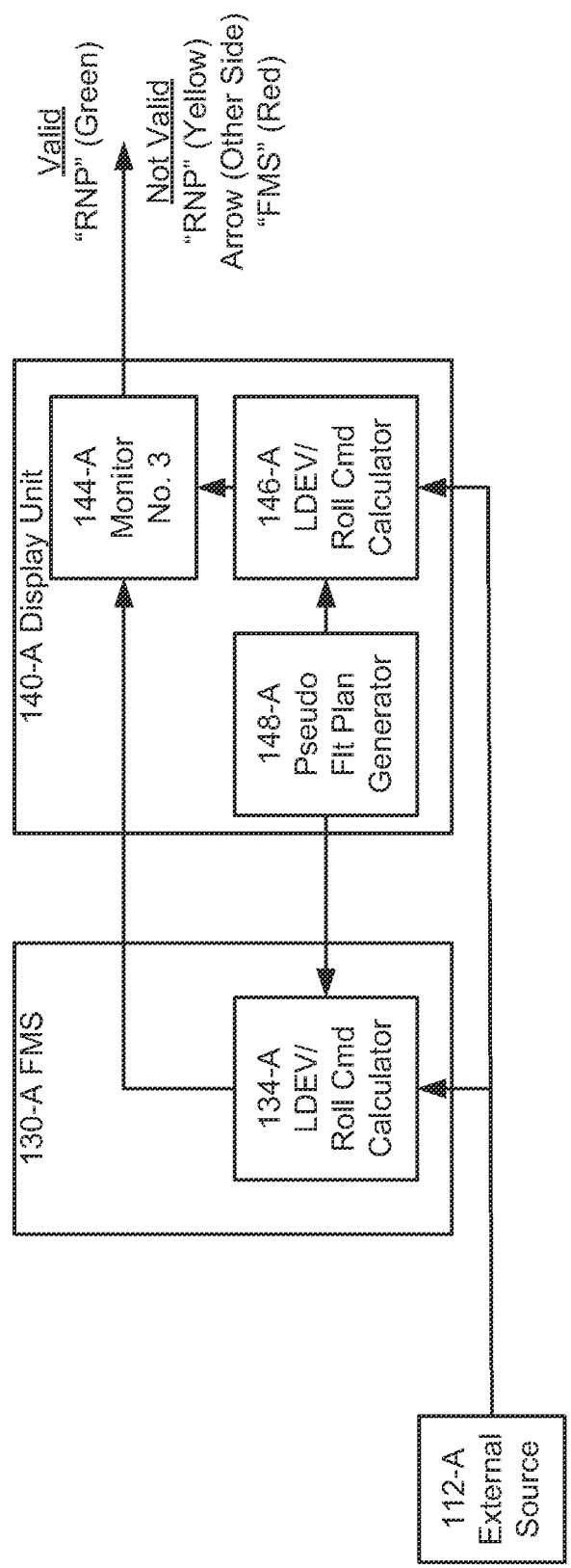
FIG. 8 depicts a data flow diagram corresponding to the method shown in FIG. 7.

As shown in FIGS. 7 and 8, the flowchart 400 and a data flow diagram are depicted, respectively, illustrating a method performed by Monitor No. 3 (item 144-A) for validating tactical flight data. The flowchart begins with module 402 with the receiving of flight management data representative of a first measurement of LDEV and/or Roll Command. The LDEV/Roll Command calculator 134-A of the FMS 130-A may have made such determination as a function of the pseudo flight plan 148-A and at least a measurement of aircraft geographic position provided by the external source 112-A.

The flowchart continues with module 404 with the receiving of flight management data representative of a second measurement of LDEV and/or Roll Command determined by the LDEV/Roll Command calculator 146-A of the DU 140-A, where such determination may be made as a function of the pseudo flight plan 148-A and at least a measurement of aircraft geographic position provided to it by the external source 112-B.

The flowchart continues with module 406 with the performing of a validity determination by comparing first measurement of LDEV and/or Roll Command with the second measurement of LDEV and/or Roll Command. If both measurements of LDEV and/or Roll Command fall within a tolerance limit, then Monitor No. 3 (item 144-A) may consider the FMS 130-A as being valid. As stated above, the tolerance limit(s) discussed herein could be configurable by a manufacturer and/or end-user. For example, a manufacturer and/or end-user could set the tolerance of Roll Cmd to a value of 3 degrees.

Figure 9:
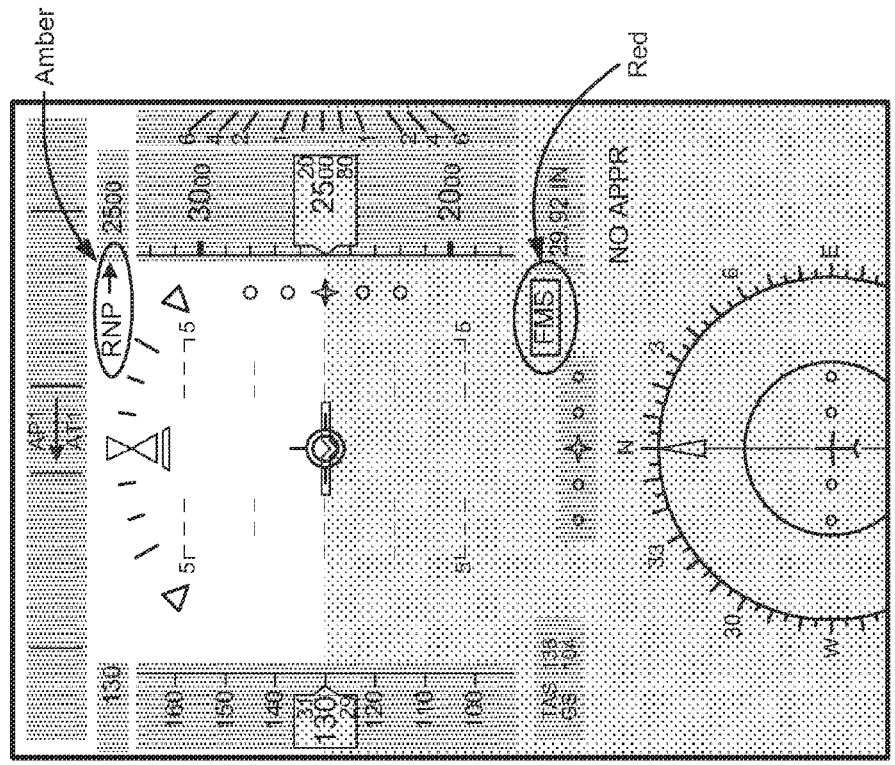
FIG. 9 depicts a tactical flight image presenting advisory information of invalid data.

The flowchart continues with module 408 with the generating of validity advisory data in response to the validity determination. For the purpose of illustration and not of limitation, a favorable validity determination may be presented visually as a text message such as, for example, a green "RNP" that is shown in FIG. 4A; similarly, an unfavorable validity determination may be presented visually as text message such as, for example, a yellow or amber "RNP" and/or a red "FMS" as shown in FIG. 9, thereby warning the pilot that data being provided by the FMS 130-A is not valid for an active instrument approach procedure maintained therein. Also, a graphical message such as an arrow could be used to point to the channel without failures, thereby informing the pilot to select another channel. Then, flowchart 400 proceeds to the end.

Figure 10:
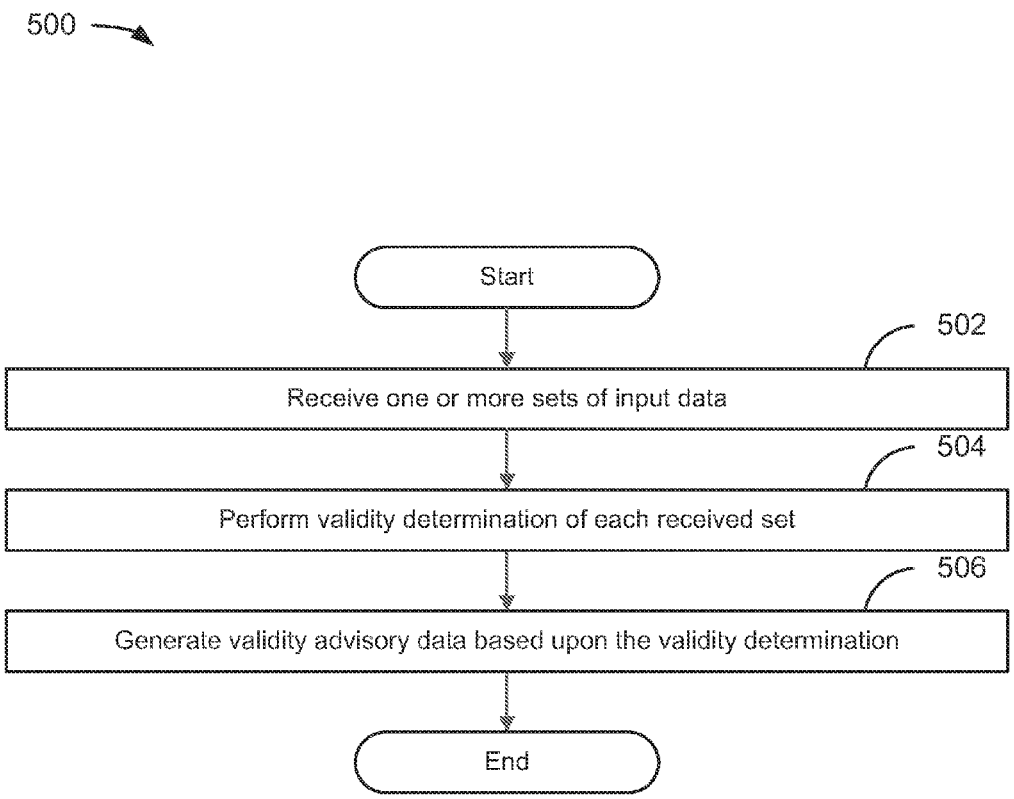
FIG. 10 depicts a flowchart of a fourth method for validating tactical flight data.

As shown in FIGS. 10 and 11, the flowchart 500 and a data flow diagram are depicted, respectively, illustrating a method performed by Monitor No. 4 (item 172) for validating tactical flight data. The flowchart begins with module 502 with the receiving of one or more sets of input data.

The first set of input data could be comprised of flight management data representative of a Roll Cmd determined by the Roll Command Calculator 138-A and flight director data representative of a Roll Cmd determined by the Roll Command Calculator 162-A, where the former may be provided by the FMS 130-A and the latter by the FD 160-A.

The second set of input data could be comprised of flight director data representative of the Roll Cmd determined by the Roll Command Calculator 162-A and symbology data representative of a visual cue of Roll Cmd determined by the Roll Command Symbology Generator 152-A, where the former may be provided by the FD 160-A and the latter by the DU 140-A.

The third set of input data could be comprised of flight management data representative of a LDEV measurement determined by the LDEV/Roll Command calculator 134-A and symbology data representative of a visual cue of the LDEV measurement determined by the LDEV Symbology Generator 150-A, where the former may be provided by the FMS 130-A and the latter by the DU 140-A.

The fourth set of input data could be comprised of flight management data representative of a Roll Cmd determined by the Roll Command Calculator 138-B and flight director data representative of a Roll Cmd determined by the Roll Command Calculator 162-B, where the former may be provided by the FMS 130-B and the latter by the FD 160-B.

The fifth set of input data could be comprised of flight director data representative of the first Roll Cmd determined by the Roll Command Calculator 162-B and symbology data representative of a visual cue of Roll Cmd determined by the Roll Command Symbology Generator 152-B, where the former may be provided by the FD 160-B and the latter by the DU 140-B.

The sixth set of input data could be comprised of flight management data representative of a LDEV measurement determined by the LDEV/Roll Command calculator 134-B and symbology data representative of a visual cue of the LDEV measurement determined by the LDEV Symbology Generator 150-B, where the former may be provided by the FMS 130-B and the latter by the DU 140-B.

The flowchart continues with module 504 with the performing of a validity determination for each set of input received in module 502. For the first set of input data, the Roll Cmd determined by the Roll Command Calculator 138-A may be compared with the Roll Cmd determined by the Roll Command Calculator 162-A. If the former and the latter fall within a tolerance limit, then Monitor No. 4 (item 172) may consider the FD 160-B as being valid. Similarly, for the fourth set of input data, the Roll Cmd determined by the Roll Command Calculator 138-B may be compared with the Roll Cmd determined by the Roll Command Calculator 162-A. If the former and the latter fall within a tolerance limit, then Monitor No. 4 (item 172) may consider the FD 160-B as being valid.

For the second set of input data, the Roll Cmd determined by the Roll Command Calculator 162-A may be compared with the visual cue of Roll Cmd determined by the Roll Command Symbology Generator 152-A. If a visual cue corresponding to the former and the latter fall within a tolerance limit, then Monitor No. 4 (item 172) may consider the DU 140-A as being valid. Similarly, for the fifth set of input data, the Roll Cmd determined by the Roll Command Calculator 162-B may be compared with the visual cue of Roll Cmd determined by the Roll Command Symbology Generator 152-B. If a visual cue corresponding to the former and the latter fall within a tolerance limit, then Monitor No. 4 (item 172) may consider the DU 140-B as being valid.

For the third set of input data, the LDEV measurement determined by the LDEV/Roll Command calculator 134-A may be compared with the LDEV measurement determined by the LDEV Symbology Generator 150-A. If a visual cue corresponding to the former and the latter fall within a tolerance limit, then Monitor No. 4 (item 172) may consider the DU 140-A as being valid. Similarly, for the sixth set of input data, the LDEV measurement determined by the LDEV/Roll Command calculator 134-B may be compared with the LDEV measurement determined by the LDEV Symbology Generator 150-B. If a visual cue corresponding to the former and the latter fall within a tolerance limit, then Monitor No. 4 (item 172) may consider the DU 140-B as being valid.

The flowchart continues with module 506 with the generating of validity advisory data in response to each validity determination of module 504. For the purpose of illustration and not of limitation, a favorable validity determination for each set of input data may be presented visually as a text message such as, for example, a green "RNP" that is shown in FIG. 4A.

Figure 12B:
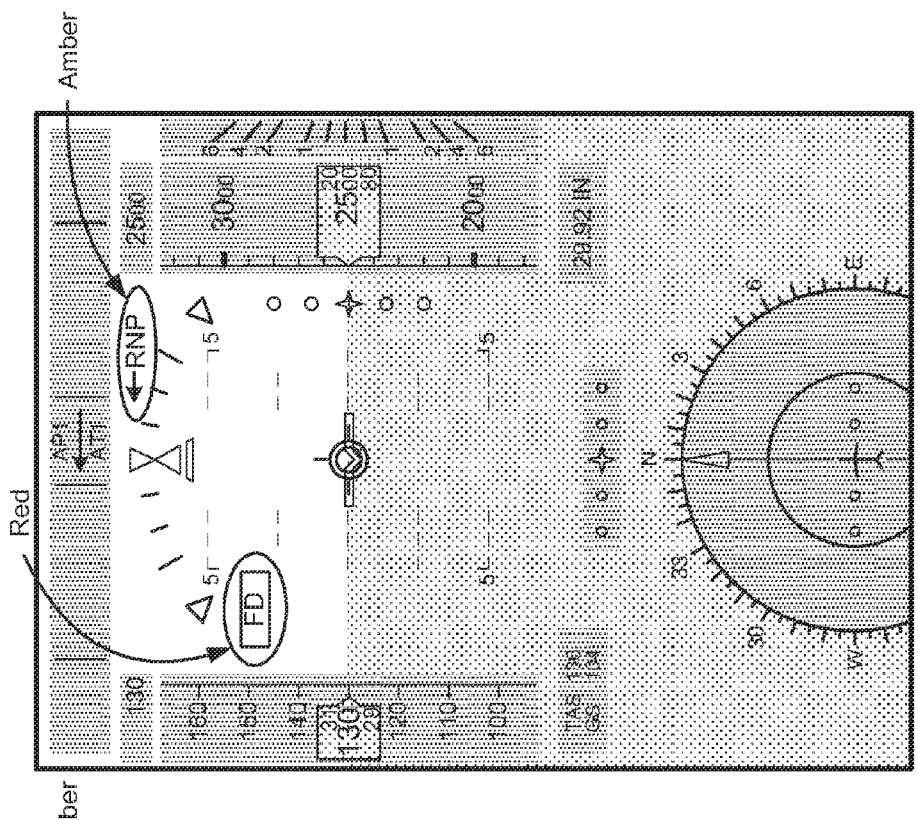
FIG. 12B depicts a tactical flight image presenting second advisory information of invalid data.
Figure 12A:
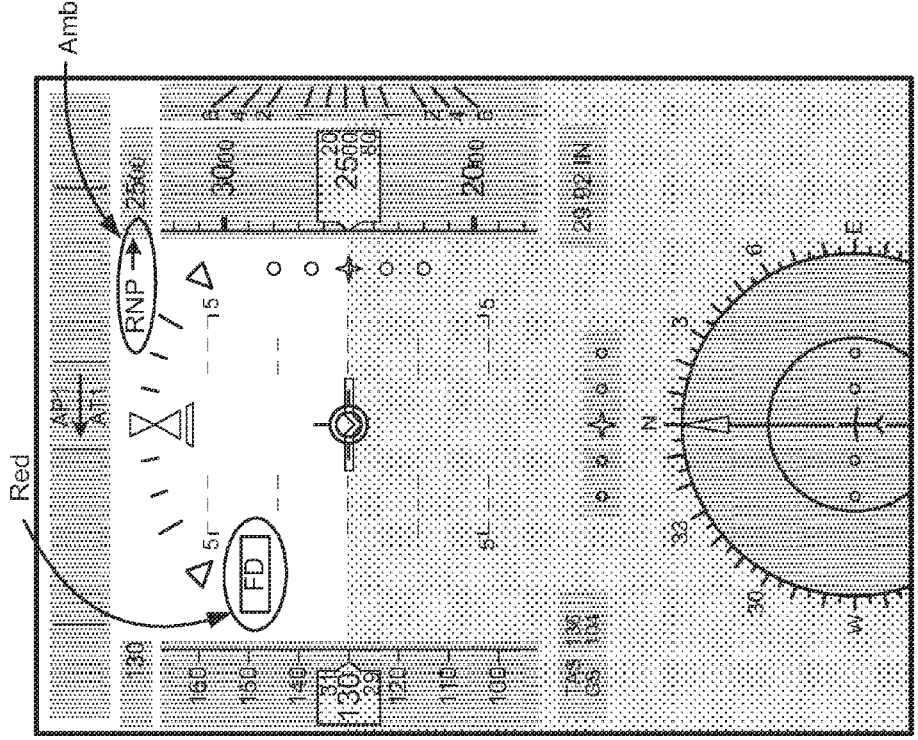
FIG. 12A depicts a tactical flight image presenting first advisory information of invalid data.

An unfavorable validity determination of the first set of input data may be presented visually as text message such as, for example, a yellow or amber "RNP" and/or a red "FD" as shown in FIG. 12A, thereby warning the pilot that data being provided by the FD 160-A is not valid for an active instrument approach procedure maintained in the FMS 130-A. Also, a graphical message such as an arrow could be used to point to another channel, providing an indication to the pilot to switch to the other channel (e.g., Communications Channel 120-B).

An unfavorable validity determination of the fourth set of input data may be presented visually as text message such as, for example, a yellow or amber "RNP" and/or a red "FD" as shown in FIG. 12B, thereby warning the pilot that data being provided by the FD 160-B is not valid for an active instrument approach procedure maintained in the FMS 130-B. Also, a graphical message such as an arrow could be used to point to another channel, providing an indication to the pilot to switch to the other channel (e.g., Communications Channel 120-A).

An unfavorable validity determination of the second and/or third sets of input data may be presented visually as text message such as, for example, a yellow or amber "RNP" and/or a red "DU" as shown in FIG. 13A, thereby warning the pilot that data being provided by the DU 140-A is not valid for an active instrument approach procedure maintained in the FMS 130-A. Also, a graphical message such as an arrow could be used to point to another channel, providing an indication to the pilot to switch to the other channel (e.g., Communications Channel 120-B).

An unfavorable validity determination of the fifth and/or sixth sets of input data may be presented visually as text message such as, for example, a yellow or amber "RNP" and/or a red "DU" as shown in FIG. 13B, thereby warning the pilot that data being provided by the DU 140-B is not valid for an active instrument approach procedure maintained in the FMS 130-B. Also, a graphical message such as an arrow could be used to point to another channel, providing an indication to the pilot to switch to the other channel (e.g., Communications Channel 120-A).

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for validating tactical flight data employed in a multi-channel topological architecture, such system comprising:
    at least one source of navigation data;
    a first communications channel comprised of at least
        a first source of flight management data, and
        a first monitor; and
    a second communications channel comprised of at least
        a second source of flight management data, and
        a second monitor, where
            the first monitor is configured to
                receive first flight management data from the first source of flight management data, where
                    the first flight management data is representative of a first measurement of lateral deviation determined as a function of
                        an active flight plan, and
                        a first measurement of aircraft geographic position of a first source of navigation data;
                receive second flight management data from the second source of flight management data, where
                    the second flight management data is representative of a second measurement of lateral deviation determined as a function of
                        the active flight plan, and
                        a second measurement of aircraft geographic position of a second source of navigation data;
                perform a first validity determination as a function of
                    the first measurement of lateral deviation, and
                    the second measurement of lateral deviation, such that
                        the validity of at least the first and second measurements of aircraft geographic position is determined; and
                generate first validity advisory data responsive to the first validity determination.

2. The system of claim 1, wherein
the first communications channel is further comprised a first display unit, and
the second communications channel is further comprised a second display unit, such that
    the first display unit is comprised of the first monitor, and
    the second display unit is comprised of the second monitor.

3. The system of claim 1, wherein
the first communications channel is further comprised of a third monitor configured to
    receive navigation data representative of the first measurement of geographic position;
    receive navigation data representative of the second measurement of geographic position;
    receive navigation data representative of a third measurement of geographic position of a third source of navigation data;
    perform a second validity determination as a function of
        the first measurement of geographic position,
        the second measurement of geographic position, and
        the third measurement of geographic position; and
    generate second validity advisory data responsive to the second validity determination.

4. A system of claim 3, wherein the first source of flight management data is comprised of the third monitor.

5. The system of claim 3, wherein
the first communications channel is further comprised of
- a third source of flight management data, and
- a fourth monitor, where
  - the fourth monitor is configured to
    - receive third flight management data from the first source of flight management data, where
      - the third flight management data is representative of a first measurement of lateral deviation, roll command, or both determined as a function of
        - a first pseudo flight plan, and
        - the first measurement of aircraft geographic position;
    - receive fourth flight management data from the third source of flight management data, where
      - the fourth flight management data is representative of a second measurement of lateral deviation, roll command, or both determined as a function of
        - the first pseudo flight plan, and
        - the first measurement of aircraft geographic position;
    - perform a third validity determination as a function of
      - the first measurement of lateral deviation, roll command, or both, and
      - the second measurement of lateral deviation, roll command, or both; and
    - generate third validity advisory data responsive to the third validity determination.

6. The system of claim 5, wherein
the third source of flight management data is comprised of
- a first display unit or a second display unit, where
  - the first display unit or the second display unit is comprised of the fourth monitor.

7. The system of claim 5, further comprising:
- a fifth monitor that is external to both the first communications channel and the second communications channel, where
  - the first communications channel is further comprised of
    - a first source of flight director data, and
    - a first source of symbology data,
  - the second communications channel is further comprised of
    - a second source of flight director data, and
    - a second source of symbology data, and
  - the fifth monitor is configured to
    - receive at least one of a plurality sets of input data, where
      - a first set of input data is comprised of fifth flight management data and first flight director data, where
        - the fifth flight management data is received from the first source of flight management data, and representative of a first roll command, and
        - the first flight director data is received from the first source of flight director data, and representative of a second roll command,
      - a second set of input data is comprised of the first flight director data and first symbology data, where
        - the first symbology data is received from the first source of symbology data, and representative of a visual cue of the second roll command,
      - a third set of input data is comprised of the first flight management data and second symbology data, where
        - the second symbology data is received from the first source of symbology data, and representative of a visual cue of the first measurement of lateral deviation,
      - a fourth set of input data is comprised of sixth flight management data and second flight director data, where
        - the sixth flight management data is received from the second source of flight management data, and representative of a third roll command, and
        - the second flight director data is received from the second source of flight director data, and representative of a fourth roll command,
      - a fifth set of input data is comprised of the second flight director data and third symbology data, where
        - the third symbology data is received from the second source of symbology data, and representative of a visual cue of the fourth roll command, and
      - a sixth set of input data is comprised of the second flight management data and fourth symbology data, where
        - the fourth symbology data is received from the second source of symbology data, and representative of a visual cue of the second measurement of lateral deviation;
    - perform one validity determination for each received set of input data, where
      - a fourth validity determination is performed as a function of
        - the first roll command, and
        - the second roll command,
      - a fifth validity determination is performed as a function of
        - the second roll command, and
        - the visual cue of the second roll command,
      - a sixth validity determination is performed as a function of
        - the first measurement of lateral deviation, and
        - the visual cue of the first measurement of lateral deviation,
      - a seventh validity determination is performed as a function of
        - the third roll command, and
        - the fourth roll command,
      - a eighth validity determination is performed as a function of
        - the fourth roll command, and
        - the visual cue of the fourth roll command, and
      - a ninth validity determination is performed as a function of
        - the second measurement of lateral deviation, and
        - the visual cue of the second measurement of lateral deviation; and generate fourth advisory data responsive to each validity determination performed on each set of received input data.

8. The system of claim 7, wherein a third display unit is comprised of the fifth monitor.

9. A system for validating tactical flight data employed in a multi-channel topological architecture, such system comprising:
at least one source of navigation data;
a first communications channel comprised of at least
a first source of flight management data,
a second source of flight management data, and
a first monitor; and
a second communications channel comprised of at least
a third source of flight management data,
a fourth source of flight management data, and
a second monitor, where
the first monitor is configured to
receive first flight management data from the first source of flight management data, where
the first flight management data is representative of a first measurement of lateral deviation, roll command, or both determined as a function of
a first pseudo flight plan, and
a first measurement of aircraft geographic position of a first source of navigation data;
receive second flight management data from the second source of flight management data, where
the second flight management data is representative of a second measurement of lateral deviation, roll command, or both determined as a function of
the first pseudo flight plan, and
the first measurement of aircraft geographic position;
perform a first validity determination as a function of
the first measurement of lateral deviation, roll command, or both, and
the second measurement of lateral deviation, roll command, or both; and
generate first validity advisory data responsive to the first validity determination.

10. The system of claim 9, wherein
the second source of flight management data is comprised of a display unit, where
the display unit is comprised of the first monitor.

11. The system of claim 9, further comprising:
a third monitor that is external to both the first communications channel and the second communications channel, where
the first communications channel is further comprised of
a first source of flight director data, and
a first source of symbology data,
the second communications channel is further comprised of
a second source of flight director data, and
a second source of symbology data, and
the third monitor is configured to
receive at least one of a plurality sets of input data, where
a first set of input data is comprised of third flight management data and first flight director data, where
the third flight management data is
received from the first source of flight management data, and
representative of a first roll command, and
the first flight director data is
received from the first source of flight director data, and
representative of a second roll command,
a second set of input data is comprised of the first flight director data and first symbology data, where
the first symbology data is
received from the first source of symbology data, and
representative of a visual cue of the second roll command, or
a third set of input data is comprised of the first flight management data and second symbology data, where
the second symbology data is
received from the first source of symbology data, and
representative of a visual cue of the first measurement of lateral deviation,
a fourth set of input data is comprised of fourth flight management data and second flight director data, where
the fourth flight management data is
received from the second source of flight management data, and
representative of a third roll command, and
the second flight director data is
received from the second source of flight director data, and
representative of a fourth roll command,
a fifth set of input data is comprised of the second flight director data and third symbology data, where
the third symbology data is
received from the second source of symbology data, and
representative of a visual cue of the fourth roll command, and
a sixth set of input data is comprised of the second flight management data and fourth symbology data, where
the fourth symbology data is
received from the second source of symbology data, and
representative of a visual cue of the second measurement of lateral deviation;
perform one validity determination for each received set of input data, where
a second validity determination is performed as a function of
the first roll command, and
the second roll command,
a third validity determination is performed as a function of
the second roll command, and
the visual cue of the second roll command,
a fourth validity determination is performed as a function of
the first measurement of lateral deviation, and
the visual cue of the first measurement of lateral deviation,
a fifth validity determination is performed as a function of
the third roll command, and
the fourth roll command, a sixth validity determination is performed as a function of
the fourth roll command, and
the visual cue of the fourth roll command, and
a seventh validity determination is performed as a function of
the second measurement of lateral deviation, and
the visual cue of the second measurement of lateral deviation; and
generate second advisory data responsive to each validity determination performed on each set of received input data.

12. A system for validating tactical flight data employed in a multi-channel topological architecture, such system comprising:
at least one communication channel, where
a first communications channel is comprised of at least two of
a first source of flight management data,
a first source of flight director data, and
a first source of symbology data, and
a second communications channel comprised of at least two of
a second source of flight management data,
a second source of flight director data, and
a second source of symbology data; and
a monitor that is external to both a first communications channel, a second communications channel, or both, where
the monitor is configured to
receive at least one of a plurality sets of input data, where
a first set of input data is comprised of first flight management data and first flight director data, where
the first flight management data is
received from the first source of flight management data, and
representative of a first roll command, and
the first flight director data is
received from the first source of flight director data, and
representative of a second roll command,
a second set of input data is comprised of the first flight director data and first symbology data, where
the first symbology data is
received from the first source of symbology data, and
representative of a visual cue of the second roll command,
a third set of input data is comprised of second flight management data and second symbology data, where
the second flight management data is
received from the first source of flight management data, and
representative of a first measurement of lateral deviation, and
the second symbology data is
received from the first source of symbology data, and
representative of a visual cue of the first measurement of lateral deviation,
a fourth set of input data is comprised of third flight management data and second flight director data, where
the third flight management data is
received from the second source of flight management data, and
representative of a third roll command, and
the second flight director data is
received from the second source of flight director data, and
representative of a fourth roll command,
a fifth set of input data is comprised of the second flight director data and third symbology data, where
the third symbology data is
received from the second source of symbology data, and
representative of a visual cue of the fourth roll command, and
a sixth set of input data is comprised of fourth flight management data and fourth symbology data, where
the fourth flight management data is
received from the second source of flight management data, and
representative of a second measurement of lateral deviation, and
the fourth symbology data is
received from the second source of symbology data, and
representative of a visual cue of the second measurement of lateral deviation;
perform one validity determination for each received set of input data, where
a first validity determination is performed as a function of
the first roll command, and
the second roll command,
the second validity determination is performed as a function of
the second roll command, and
the visual cue of the second roll command,
the third validity determination is performed as a function of
the first measurement of lateral deviation, and
the visual cue of the first measurement of lateral deviation,
a fourth validity determination is performed as a function of
the third roll command, and
the fourth roll command,
the fifth validity determination is performed as a function of
the fourth roll command, and
the visual cue of the fourth roll command, and
the sixth validity determination is performed as a function of
the second measurement of lateral deviation, and
the visual cue of the second measurement of lateral deviation; and
generate first advisory data responsive to each validity determination performed on each received set of input data.

13. The system of claim 12, wherein a display unit is comprised of the monitor.

14. A method for validating tactical flight data employed in a multi-channel topological architecture, such method comprising:

receiving first flight management data from a first source of flight management data of a first communications channel, where
    the first flight management data is representative of a
        first measurement of lateral deviation determined as a function of
            an active flight plan, and
            a first measurement of aircraft geographic position of a first source of navigation data;
receiving second flight management data from a second source of flight management data of a second communications channel, where
    the second flight management data is representative of a
        second measurement of lateral deviation determined as a function of
            the active flight plan, and
            a second measurement of aircraft geographic position of a second source of navigation data;
performing a first validity determination as a function of
    the first measurement of lateral deviation, and
    the second measurement of lateral deviation, such that
        the validity of at least the first and second measurements of aircraft geographic position is determined; and
generating first validity advisory data responsive to the first validity determination.

15. The method of claim 14, wherein
the first communications channel is comprised a first display unit, and
the second communications channel is comprised a second display unit, such that
    the first display unit is comprised of a first monitor, and
    the second display unit is comprised of a second monitor.

16. The method of claim 14, further comprising:
receiving navigation data representative of the first measurement of geographic position;
receiving navigation data representative of the second measurement of geographic position;
receiving navigation data representative of a third measurement of geographic position of a third source of navigation data;
performing a second validity determination as a function of
    the first measurement of geographic position,
    the second measurement of geographic position, and
    the third measurement of geographic position; and
generating second validity advisory data responsive to the second validity determination.

17. A method of claim 16, wherein the first source of flight management data is comprised of a third monitor.

18. The method of claim 16, further comprising:
receiving third flight management data from the first source of flight management data, where
    the third flight management data is representative of a
        first measurement of lateral deviation, roll command, or both determined as a function of
            a first pseudo flight plan, and
            the first measurement of aircraft geographic position;
receiving fourth flight management data from a third source of flight management data where
    the fourth flight management data is representative of a
        second measurement of lateral deviation, roll command, or both determined as a function of
            the first pseudo flight plan, and
            the first measurement of aircraft geographic position;
performing a third validity determination as a function of
    the first measurement of lateral deviation, roll command, or both, and
    the second measurement of lateral deviation, roll command, or both; and
generating third validity advisory data responsive to the third validity determination.

19. The method of claim 18, wherein
the third source of flight management data is comprised of a first display unit or a second display unit, where
    the first display unit or the second display unit is comprised of a fourth monitor.

20. The method of claim 18, further comprising:
receiving at least one of a plurality sets of input data, where
    a first set of input data is comprised of fifth flight management data and first flight director data, where
        the fifth flight management data is
            received from the first source of flight management data, and
            representative of a first roll command, and
        the first flight director data is
            received from the first source of flight director data, and
            representative of a second roll command,
    a second set of input data is comprised of the first flight director data and first symbology data, where
        the first symbology data is
            received from the first source of symbology data, and
            representative of a visual cue of the second roll command,
    a third set of input data is comprised of the first flight management data and second symbology data, where
        the second symbology data is
            received from the first source of symbology data, and
            representative of a visual cue of the first measurement of lateral deviation,
    a fourth set of input data is comprised of sixth flight management data and second flight director data, where
        the sixth flight management data is
            received from the second source of flight management data, and
            representative of a third roll command, and
        the second flight director data is
            received from the second source of flight director data, and
            representative of a fourth roll command,
    a fifth set of input data is comprised of the second flight director data and third symbology data, where
        the third symbology data is
            received from the second source of symbology data, and
            representative of a visual cue of the fourth roll command, and
    a sixth set of input data is comprised of the second flight management data and fourth symbology data, where
        the fourth symbology data is
            received from the second source of symbology data, and
            representative of a visual cue of the second measurement of lateral deviation;
performing one validity determination for each received set of input data, where
    a fourth validity determination is performed as a function of
        the first roll command, and the second roll command,
a fifth validity determination is performed as a function of
the second roll command, and
the visual cue of the second roll command,
a sixth validity determination is performed as a function of
the first measurement of lateral deviation, and
the visual cue of the first measurement of lateral deviation,
a seventh validity determination is performed as a function of
the third roll command, and
the fourth roll command,
a eighth validity determination is performed as a function of
the fourth roll command, and
the visual cue of the fourth roll command, and
a ninth validity determination is performed as a function of
the second measurement of lateral deviation, and
the visual cue of the second measurement of lateral deviation; and
generating fourth advisory data responsive to each validity determination performed on each set of received input data.

21. The method of claim 20, wherein a display unit that is external to both the first communications channel and the second communications channel is comprised of a fifth monitor.

22. A method for validating tactical flight data employed in a multi-channel topological architecture, such method comprising:
receiving first flight management data from a first source of flight management data of a first communications channel, where
the first flight management data is representative of a
first measurement of lateral deviation, roll command, or both determined as a function of
a first pseudo flight plan, and
a first measurement of aircraft geographic position of a first source of navigation data;
receiving second flight management data from a second source of flight management data of the first communications channel, where
the second flight management data is representative of a
second measurement of lateral deviation, roll command, or both determined as a function of
the first pseudo flight plan, and
the first measurement of aircraft geographic position;
performing a first validity determination as a function of
the first measurement of lateral deviation, roll command, or both, and
the second measurement of lateral deviation, roll command, or both; and
generating first validity advisory data responsive to the first validity determination.

23. The method of claim 22, wherein
the second source of flight management data is comprised of a display unit, where
the display unit is comprised of a first monitor.

24. The method of claim 22, further comprising:
receiving at least one of a plurality sets of input data, where
a first set of input data is comprised of third flight management data and first flight director data, where
the third flight management data is
received from the first source of flight management data, and
representative of a first roll command, and
the first flight director data is
received from a first source of flight director data, and
representative of a second roll command,
a second set of input data is comprised of the first flight director data and first symbology data, where
the first symbology data is
received from a first source of symbology data, and
representative of a visual cue of the second roll command, or
a third set of input data is comprised of the first flight management data and second symbology data, where
the second symbology data is
received from the first source of symbology data, and
representative of a visual cue of the first measurement of lateral deviation,
a fourth set of input data is comprised of fourth flight management data and second flight director data, where
the fourth flight management data is
received from the second source of flight management data, and
representative of a third roll command, and
the second flight director data is
received from a second source of flight director data, and
representative of a fourth roll command,
a fifth set of input data is comprised of the second flight director data and third symbology data, where
the third symbology data is
received from a second source of symbology data, and
representative of a visual cue of the fourth roll command, or
a sixth set of input data is comprised of the second flight management data and fourth symbology data, where
the fourth symbology data is
received from the second source of symbology data, and
representative of a visual cue of the second measurement of lateral deviation;
performing one validity determination for each received set of input data, where
a second validity determination is performed as a function of
the first roll command, and
the second roll command,
a third validity determination is performed as a function of
the second roll command, and
the visual cue of the second roll command,
a fourth validity determination is performed as a function of
the first measurement of lateral deviation, and
the visual cue of the first measurement of lateral deviation,
a fifth validity determination is performed as a function of
the third roll command and
the fourth roll command,
a sixth validity determination is performed as a function of
the fourth roll command, and the visual cue of the fourth roll command,
a seventh validity determination is performed as a function of
the second measurement of lateral deviation, and
the visual cue of the second measurement of lateral deviation; and
generating second advisory data responsive to each validity determination performed on each set of received input data.

25. A method for validating tactical flight data employed in a multi-channel topological architecture, such method comprising:
receiving at least one of a plurality sets of input data, where
a first set of input data is comprised of first flight management data and first flight director data, where
the first flight management data is
received from a first source of flight management data of a first communications channel, and
representative of a first roll command, and
the first flight director data is
received from a first source of flight director data of the first communications channel, and
representative of a second roll command,
a second set of input data is comprised of the first flight director data and first symbology data, where
the first symbology data is
received from a first source of symbology data of the first communications channel, and
representative of a visual cue of the second roll command,
a third set of input data is comprised of second flight management data and second symbology data, where
the second flight management data is
received from the first source of flight management data, and
representative of a first measurement of lateral deviation, and
the second symbology data is
received from the first source of symbology data, and
representative of a visual cue of the first measurement of lateral deviation,
a fourth set of input data is comprised of third flight management data and second flight director data, where
the third flight management data is
received from a second source of flight management data of a second communications channel, and
representative of a third roll command and
the second flight director data is
received from a second source of flight director data of the second communications channel, and
representative of a fourth roll command,
a fifth set of input data is comprised of the second flight director data and third symbology data, where
the third symbology data is
received from a second source of symbology data of the second communications channel, and
representative of a visual cue of the fourth roll command, or
a sixth set of input data is comprised of fourth flight management data and fourth symbology data, where
the fourth flight management data is
received from the second source of flight management data, and
representative of a second measurement of lateral deviation, and
the fourth symbology data is
received from the second source of symbology data, and
representative of a visual cue of the second measurement of lateral deviation,
performing one validity determination for each received set of input data, where
a first validity determination is performed as a function of
the first roll command, and
the second roll command,
a second validity determination is performed as a function of
the second roll command, and
the visual cue of the second roll command,
a third validity determination is performed as a function of
the first measurement of lateral deviation, and
the visual cue of the first measurement of lateral deviation,
a fourth validity determination is performed as a function of
the third roll command, and
the fourth roll command,
a fifth validity determination is performed as a function of
the fourth roll command, and
the visual cue of the fourth roll command, and
a sixth validity determination is performed as a function of
the second measurement of lateral deviation, and
the visual cue of the second measurement of lateral deviation,
generating first advisory data responsive to each validity determination performed on each received set of input data.

26. The method of claim 25, wherein a display unit that is external to both the first communications channel and the second communications channel is comprised of a monitor.

* * * * *